United States Patent [19]

Lai et al.

[11] Patent Number: 6,156,819

[45] Date of Patent: Dec. 5, 2000

[54] USE OF LOW- AND HIGH-MOLECULAR-WEIGHT POLYMERS IN WELL TREATMENTS

[75] Inventors: Quintin J. Lai, Anchorage, Ala.; Daniel P. Newhouse, Spring, Tex.

[73] Assignee: Atlantic Richfield Company, Chicago, Ill.

[21] Appl. No.: 09/217,766

[22] Filed: Dec. 21, 1998

[51] Int. Cl.[7] .................................................. C09K 7/02
[52] U.S. Cl. ........................ 523/130; 523/132; 524/407; 525/194; 525/196
[58] Field of Search .................................. 523/130, 132; 524/503, 521, 407; 525/197, 194, 196

[56] References Cited

U.S. PATENT DOCUMENTS

| | | | |
|---|---|---|---|
| 2,842,205 | 7/1958 | Allen et al. | 166/21 |
| 2,968,572 | 1/1961 | Peeler | 106/74 |
| 3,306,756 | 2/1967 | Miller | 106/84 |
| 3,306,758 | 2/1967 | Miller | 106/84 |
| 3,449,139 | 6/1969 | Kuhn | 106/84 |
| 4,293,340 | 10/1981 | Metz | 106/74 |
| 4,354,874 | 10/1982 | Vickers | 106/74 |
| 4,354,875 | 10/1982 | Powers et al. | 106/74 |
| 4,384,894 | 5/1983 | Vickers et al. | 106/80 |
| 4,588,508 | 5/1986 | Allenson et al. | 210/708 |
| 4,683,949 | 8/1987 | Sydansk et al. | 166/270 |
| 4,722,397 | 2/1988 | Sydansk et al. | 166/295 |
| 4,724,906 | 2/1988 | Sydansk | 166/295 |
| 4,730,675 | 3/1988 | Wygant et al. | 166/295 |
| 4,770,245 | 9/1988 | Sydansk | 166/295 |
| 4,968,442 | 11/1990 | Falk | 252/8.551 |
| 4,974,677 | 12/1990 | Shu | 166/270 |
| 4,986,356 | 1/1991 | Lockhart et al. | 166/300 |
| 4,994,194 | 2/1991 | Moradi-Araghi | 252/8.551 |
| 5,002,431 | 3/1991 | Heymans et al. | 405/128 |
| 5,010,954 | 4/1991 | Falk | 166/295 |
| 5,048,609 | 9/1991 | Tackett, Jr. et al. | 166/295 |
| 5,082,057 | 1/1992 | Sydansk | 166/295 |
| 5,125,456 | 6/1992 | Hutchins et al. | 166/295 |
| 5,139,087 | 8/1992 | Hutchins et al. | 166/249 |
| 5,244,936 | 9/1993 | Mitchell | 523/130 |
| 5,314,019 | 5/1994 | Honarpour | 166/270 |
| 5,338,465 | 8/1994 | Lockhart et al. | 252/8.551 |
| 5,404,951 | 4/1995 | Lai et al. | 166/295 |
| 5,421,411 | 6/1995 | Sydansk | 166/295 |

OTHER PUBLICATIONS

SPE/DOE 17329 "A New Conformance–Improvement–Treatment Chromium (III) Gel Technology", by R. D. Sydansk; Society of Petroleum Engineers, Inc./U.S. Department of Energy, Apr. 20, 1998.

*Primary Examiner*—Edward J. Cain
*Assistant Examiner*—Katarzyna Wyrozebski
*Attorney, Agent, or Firm*—Roberet E. Sloat; F. Lindsay Scott

[57] ABSTRACT

An aqueous polymer composition containing water and hydrophilic polymers and a method for treating subterranean formations with the composition to reduce formation permeability. The hydrophilic polymers are a mixture of high-molecular-weight polymers having a molecular weight of at least about 2,000,000, and low-molecular-weight polymers having a molecular weight of up to about 1,000,000.

21 Claims, No Drawings

USE OF LOW- AND HIGH-MOLECULAR-WEIGHT POLYMERS IN WELL TREATMENTS

BACKGROUND OF THE INVENTION

1. Field of the Invention

This invention relates to a method of treating permeable formations using polymer gels, and in particular, to a method of treating subterranean formations in oil and gas wells using polymer gels to reduce the formation permeability, and more particularly to a method of treating such formations to retard or halt the unwanted flow of certain fluids within the formation.

2. Brief Description of the Prior Art

In oil and gas wells, it is sometimes desirable to block or reduce the permeability of certain zones or regions of the subterranean formation surrounding the well. For example, water from water-bearing zones can interfere with oil or gas recovery operations. The production of water from these zones may reduce the amount of hydrocarbons that can be recovered from the well and may require additional separation and disposal procedures if the water is removed from the well along with the oil and gas. Thus, it is beneficial to limit the flow from these water-bearing regions so that the desired oil or gas can be recovered more effectively.

Polymer gels formed from hydrophilic polymers, such as polyacrylamide, have been used in the past to reduce the permeability of selected zones within subterranean formations in oil and gas wells. These polymers are usually mixed with water at the surface to produce aqueous solutions which are pumped into the formation. A crosslinking agent is typically added to the solution at the surface, along with any delaying agents or gel inhibitors, so that once the solutions are in place within the desired region of the formation, the polymers begin to gel or crosslink so that the polymers gel in place and plug the pore channels and flow paths of the formation and the permeability of the formation is effectively reduced or blocked, especially in high water cut zones.

High-molecular-weight polymer solutions are characterized by a high pre-gel viscosity. For formations having a high permeability, i.e. greater than 1000 mDarcy, such as naturally fractured or operationally fractured, and formations which have a high fluid loss (high permeability) which may occur as lost circulation during drilling operations, high-molecular-weight polymers are often employed, because of their high pre-gel viscosity. High-molecular-weight polymer solutions produce less viscous gels which are less resistant to removal by formation fluids. In low permeability formations, low-molecular-weight polymers or non-ionic polymers may be used because of their lower pre-gel viscosity, which allows them to be more readily injected into the pore channels and smaller flow paths of the formation matrix. Larger quantities of the low-molecular-weight polymers are required to achieve higher viscosities. The low-molecular-weight polymers produce a highly viscous, solid-like gel, sometimes referred to as a "ringing gel". By comparison, the high-molecular-weight polymers produce less viscous gels, sometimes descriptively referred to as a "tonguing gel", or in some cases a more viscous "rigid gel", both of which are less viscous than the solid-like ringing gel produced by the low-molecular-weight polymers described above. A gel strength code is disclosed in U.S. Pat. No. 4,770,245 "Rate-Controlled Polymer Gelation Process for Oil Recovery Operations", issued Sep. 13, 1988 to Robert D. Sydansk and assigned on its face to Marathon Oil Company. This patent is hereby incorporated in its entirety by reference. Typically in formation treatments, a higher concentration of the low-molecular-weight polymer is required to obtain the desired final gel viscosity. For example, aqueous solutions of low-molecular weight polymers used in treating permeable formations may employ from 4 to 6 weight percent of polymer in the solution to provide an adequate final gel viscosity. By contrast, formation treatments utilizing high-molecular-weight polymers may contain, for example, only 0.045 to 1.5 weight percent of polymer and are less expensive. Because of the large amounts of the low-molecular-weight polymer necessary to produce the desired viscosity for most formation treatments, solutions utilizing the low-molecular-weight gels are more expensive and therefore add to the overall expense of the treatment.

What is therefore needed is a polymer gel and method of treating a subterranean formation with an aqueous solution of water-soluble, crosslinkable polymers which utilize lower concentrations of low-molecular-weight polymers while providing a suitable pre-gelled viscosity in the formation and a gel that is not easily flowed through, leached or removed once the gel is in place in the formation.

SUMMARY OF THE INVENTION

A gel composition which provides a suitable viscosity for injection and a gel having a suitable gelled viscosity consists essentially of: a) water; b) from about 0.05 to about 2.0 weight percent of the composition of high-molecular-weight polymers having an average molecular weight of at least about 2,000,000 and from about 0.1 to about 10.0 weight percent of the composition of low-molecular-weight polymers having an average molecular weight up to about 1,000,000; and c) a crosslinking agent for crosslinking the hydrophilic polymers to form a gel in a subterranean formation.

The present invention further comprises a method of treating a permeable formation penetrated by at least one wellbore using an aqueous solution of hydrophilic polymers containing polymers consisting essentially of from about 0.05 to about 2.0 weight percent high-molecular-weight polymers having an average molecular weight of at least 2,000,000 and from about 0.1 to about 10.0 weight percent low-molecular-weight polymers having an average molecular weight less than 1,000,000; and injecting the aqueous solution along with a crosslinking agent into the formation via the wellbore and allowing the aqueous solution of hydrophilic polymers to crosslink to form a gel.

DESCRIPTION OF THE PREFERRED EMBODIMENTS

In blocking or reducing the permeability of low-permeable formations, i.e. formations having a permeability of less than about 1000 mDarcy, low-molecular-weight ionic polymer or non-ionic polymer solutions are typically employed because of their relatively low viscosity. Low-molecular-weight polymers and non-ionic polymers provide good penetration into the matrix of low-permeable formations and form a strong gel that is not easily leached, flowed through, or removed, once in place.

High-molecular-weight ionic polymers, because of their high pre-gel viscosity, are usually less desirable for use in treating lower-permeable formations due to their inability to readily penetrate the small pore channels of the formation matrix unless sufficient shear forces are provided. High-molecular-weight non-ionic polymers may be used because their gelation rate is greatly reduced relative to ionic high-molecular-weight polymers. This allows the high-molecular-weight non-ionic polymers to enter the low-permeability matrix and allows sufficient pump time for injection. High-molecular-weight ionic polymers are used where higher viscosity aqueous solutions are desirable.

It has been discovered that by combining selected amounts of both low- and high-molecular-weight ionic polymers in a polymer gel, the amount of low-molecular-weight polymer needed to achieve the desired polymer solution viscosity can be greatly reduced for use in certain applications, such as in plugging high-permeability formations, where only high-molecular-weight ionic polymers have been employed before.

The use of high molecular weight polymers in low molecular weight polymer solutions will prevent leak-off in some permeability ranges. This can divert the low molecular weight polymer solution into high permeability regions which can enable the positioning of a low molecular weight system in a high permeability region in fluid communication with the polymer solution to form a more desirable gel more economically in such regions. Previously, high molecular weight polymer solutions were required for such application because of the necessity for a high pre-gelled viscosity. By preventing leak-off into lower permeability zones which are frequently the oil-producing zones, the mixture of high and low molecular weight polymers enables the treatment of high permeability zones with the mixture while inhibiting the entry of the low molecular weight polymers into the low permeability zones because of the high viscosity of the mixed polymer solution As referred to herein, low-molecular weight polymers are those polymers having an average molecular weight of up to about 1,000,000. High-molecular-weight polymers, as referred to herein, are those polymers having an average molecular weight greater than about 2,000,000. Preferred low-molecular-weight polymers have an average molecular weight from about 60,000 to about 1,000,000, more preferably from about 100,000 to about 500,000, and still more preferably from about 150,000 to about 300,000. The high-molecular-weight polymers preferably have an average molecular weight from about 2,000,000 to about 30,000,000, more preferably from about 3,000,000 to about 20,000,000, and still more preferably from about 5,000,000 to about 15,000,000. In a preferred embodiment, the average molecular weight of the high-molecular-weight polymers is at least two times and preferably ten times greater than the average molecular weight of the low-molecular-weight polymers.

The polymers used for the present invention are hydrophilic polymers that generally hydrate in water and are capable of being crosslinked in solution so that the polymers are interconnected with one another to form a gel. For convenience, mixtures of polymers and water are referred to herein as solutions. While the invention in the preferred embodiment has particular application to polyacrylamide and partially hydrolyzed polyacrylamide polymers, other polymers may be used as well and are well known to those skilled in the art. These include the polymers and copolymers of acrylic acid and acrylamide, polymethacrylamides and partially hydrolyzed polymethacrylamides, sulfonated acrylamide polymers, polyvinyl polymers, such as polyvinyl alcohol, polyvinyl acetate, and polyvinyl pyrrolidone, the polyalkylenoxides, and the ammonia salts and alkali metal salts thereof. Other suitable polymers are the polysaccharides, the cellulose ethers, such as ethyl cellulose and methyl cellulose, carboxyalkylcellulose, such as carboxymethylcellulose and carboxyethyl-cellulose, and substituted and unsubstituted galactomannans, including guar gum.

The polymers are combined with a crosslinking agent to crosslink the polymers to form a crosslinked polymer gel. Various crosslinking systems can be employed in the present invention and are well known to those skilled in the art. The crosslinking agents can be inorganic or organic. Examples of suitable inorganic crosslinking agents include the salts or complexes of the multi-valent metals such as chromium, zirconium, titanium and aluminum. Tri-valent metallic ions, such as chromium and aluminum, act as particularly good crosslinkers and are frequently added as chromium acetate, chromium citrate, chromium carboxylate, chromium chloride, and aluminum citrate. These metallic crosslinkers bond ionically with the polymers to form the crosslinked molecule. Organic crosslinking agents bond by covalent bonding and include phenols, aldehydes, including dialdehydes, and ethers. Examples of these organic compounds include phenol, resorcinol, formaldehyde and divinylether. Other suitable crosslinking agents used in forming the polymer gels of the invention, both inorganic and organic, are well known and will be readily apparent to those skilled in the art. The amount of crosslinker used will vary depending upon the type of polymer and crosslinking agent being used and the amount of crosslinking desired.

Because the crosslinking agent and polymers are usually mixed at the surface, it is usually necessary to control or slow the rate of crosslinking so that the polymers do not gel too quickly prior to being introduced into the formation being treated. Most organic crosslinking agents react at a comparatively slower rate such that the use of an additional delaying agent is usually unnecessary. The inorganic crosslinking agents, however, are often used with delaying agents to slow gelation rates and to allow sufficient time for the polymer solution to be placed within the formation prior to gelling. Suitable delaying agents for use with the inorganic crosslinking agents include the 1-to-4 carbon carboxylic acids, which include maleic acid, malonic acid, citric acid, acetic acid and their derivative salts. The carboxylic acid delaying agents form a carboxylate delay ligand with the cationic metal ions and slow the crosslinking reaction. Other delay agents may also be used and are well known to those skilled in the art. The use of crosslinking using chrome ions and a crosslinking retardant system are disclosed in U.S. Pat. No. 5,338,465, "Aqueous Gelable Composition With Delayed Gelling Time", issued Aug. 16, 1994 to Lockhart et al. This patent is hereby incorporated in its entirety by reference.

In some cases, it may be necessary to initially treat the polymer prior to crosslinking to form reactive crosslinking sites. Pure polyacrylamide, for example, is electrically neutral (non-ionic) and therefore will not crosslink through ionic bonding, as occurs when using inorganic metal crosslinking agents. By adding caustic (NaOH) or other alkaline solutions to the polymer, or by the addition of heat, the amide groups of the polyacrylamide are hydrolyzed, converting some of the amide groups to carboxylate groups. The polyacrylamide is thus converted to partially hydrolyzed polyacrylamide. Up to about 60%, and typically from about 1 to about 20%, of the amide groups are converted to carboxylate groups in partially hydrolyzed polyacrylamide. The carboxylate groups of the partially hydrolyzed polyacrylamide are negatively charged and are thus susceptible to ionic crosslinking by means of the inorganic metal ion crosslinking agents discussed above. By controlling the degree of hydrolysis and the amount of carboxylate groups formed, the rate at which crosslinking occurs can be controlled, with fewer carboxylate groups resulting in increased gel times. Preferably in the present invention, for polyacrylamide, the degree of hydrolysis or conversion of amide groups to carboxylate groups is from about 0.1% to about 20% for both the low-molecular-weight and high-molecular-weight polyacrylamides. The inorganic crosslinking agent/retardant system is usually employed with polymers having a high number of reactive sites. In the case of polyacrylamide, polyacrylamide polymers having a 1% or greater degree of hydrolysis will usually require the use of a delaying agent to increase gel times. The use of hydrolysis, crosslinking metal ions or organic crosslinkers and retardant systems is considered to be well known to those skilled in the art.

In the preferred embodiment, a crosslinking system is provided that will allow both the low- and high-molecular-weight polymers to gel at substantially the same rate. In such cases, the polymers and crosslinking agent or crosslinking agent system are selected such that when the high- and low-molecular-weight polymers are gelled independently of each other using a common crosslinking agent or system, they each have substantially the same gel rate, i.e. the viscosity of each polymer gel or solution increases at substantially the same rate. Thus, when the polymers are combined together and the crosslinking agent is added, gelling of the polymer solution will occur uniformly throughout the polymer solution during crosslinking. One method of accomplishing this is to provide both low- and high-molecular weight polyacrylamide polymers with selected degrees of hydrolysis such that when the crosslinking agent is added, the polymers will gel at substantially the same rate.

The gelation rates do not have to be the same although generally the best gels are obtained most economically when the gelation rates are the same. It may be desirable to have different gelation rates in some instances such as for fluid loss control, lost circulation, and workover fluid loss.

As discussed previously, in treating subterranean formations, the polymer solution and crosslinking agent are usually combined at the surface and then pumped or injected into the well under pressure so that the solution is allowed to penetrate the surrounding formation and retained in position in the formation for a sufficient time for gelation or crosslinking to occur. In some applications, it may desirable to introduce the crosslinking agent and polymer solution separately into the formation. The polymer solution may be formed from aqueous liquids including fresh water, sea water or aqueous brines of various salts. Ideally, the salts should produce no di-valent cations when in solution. Suitable salts include potassium chloride, ammonium chloride and sodium chloride. The salts may be present in amounts ranging from about 0.1 to about 20% by weight of solution. The high-molecular-weight polymers may be dispersed in an aqueous or hydrocarbon-based fluid, such as diesel oil or kerosene, prior to forming the final polymer solution. Typically the high-molecular-weight polymers make up about 10 to about 50% by weight of the initial high-molecular-weight polymer solution or dispersion. In the case of hydrocarbon-based dispersions, the high-molecular-weight polymer dispersion may be further diluted prior to adding to the aqueous solvent of the polymer solution.

When combining the low-molecular-weight and high-molecular-weight polymers in solution, a reduced amount of low-molecular-weight polymer may be used by comparison to conventional polymer gel solutions used in treating low-permeable formations to obtain a desired gel viscosity or gel strength. This is due to the effect created by the presence of the high-molecular-weight polymers, which cause an increase in the viscosity of the final gel. The selected concentration of high- and low-molecular-weight polymers may vary depending upon the permeability and characteristics of the formation being treated and the desired final gel strength. A preferred concentration range for the low-molecular-weight polymers for most applications, however, is from about 0.1 to about 10.0 weight percent of the polymer solution, with a more preferred concentration ranging from about 0.5 to about 3.5 weight percent of the polymer solution, and a still more preferred concentration ranging from about 1 to about 2.5 weight percent of the polymer solution. For the high-molecular-weight polymers, a preferred concentration range is from about 0.05 to about 2.0 weight percent of the polymer solution, with a more preferred concentration from about 0.1 to about 1.0 weight percent of the polymer solution, and with a still more preferred concentration from about 0.3 to about 0.9 weight percent of the polymer solution.

The invention can be understood further with reference to the following examples. Unless specified otherwise, all percentages given in the below examples are weight percentages based upon the total weight of solution in which the referenced compound is contained.

EXAMPLE 1

A low-molecular-weight polymer solution containing 5.5% polyacrylamide polymer was prepared in a 2% aqueous potassium chloride solution and heated at 120° F. For approximately one hour. The low-molecular-weight polyacrylamide polymer used was that available as "AC 251"*, from Allied Colloids, Inc., having an average molecular weight from about 150,000 to 200,000. One hundred fifty milliliters of the polymer solution was then mixed with 1.02 milliliters of a 0.1N solution of sodium hydroxide and maintained at about 120° F. For approximately four hours to hydrolyze the polyacrylamide polymer. The partially hydrolyzed polymer was then used in preparing seven separate 30 ml samples in a 2% potassium chloride solution, with Samples 1–5 containing only the low-*trademark of Allied Colloids, Inc. molecular-weight polyacrylamide polymer in varying concentrations, as shown in Table I, and Samples 6–7 in Table I containing a mixture of low- and high-molecular-weight polymer. The degree of hydrolysis was chosen to allow the low-molecular-weight polymer to gel at substantially the same rate as the high-molecular-weight polyacrylamide. The high-molecular-weight polymer used was a polyacrylamide polymer, available as "ORGANOPOL"*, from Allied Colloids, Inc., having an average molecular weight of from about 3,000,000 to 5,000,000, and a 0–0.1% degree of hydrolysis. The low-molecular-weight polymer concentrations in Samples 1–5 were 1.0, 1.5, 2, 2.5 and 3.5% of the solution, respectively. The high-molecular-weight polymer in each of the Samples 6–7 was at a concentration of about 0.5% of the solution, with the low-molecular-weight polymer being at a concentration of about 1%. To initiate crosslinking, a chromium acetate crosslinking agent was added to each sample to provide a polymer/crosslinker ratio of 60:1 by weight for Samples 1–6, and a ratio of 30:1 by weight for Sample 7. The samples were then allowed to gel over the times shown at a temperature of 200° F. The results are presented in Table 1.

TABLE 1*

| GEL TIME | SAMPLE 1 1% LMW | SAMPLE 2 1.5% LMW | SAMPLE 3 2% LMW | SAMPLE 4 2.5% LMW | SAMPLE 5 3.5% LMW | SAMPLE 6 1% LMW/ 0.5% HMW | SAMPLE 7 1% LMW/ 0.5% HMW |
|---|---|---|---|---|---|---|---|
| 22 hrs | C | D | D–E | E | E–F | D | C |
| 2 days | D | E | E | E–F | E–F | D–E | D–E |
| 6 days | C–D | D–E | E | F | F | D–E | D–E |
| 7 days | D | E | E | F | F | D–E | D–E |

TABLE 1*-continued

| GEL TIME | SAMPLE 1<br>1% LMW | SAMPLE 2<br>1.5% LMW | SAMPLE 3<br>2% LMW | SAMPLE 4<br>2.5% LMW | SAMPLE 5<br>3.5% LMW | SAMPLE 6<br>1% LMW/<br>0.5% HMW | SAMPLE 7<br>1% LMW/<br>0.5% HMW |
|---|---|---|---|---|---|---|---|
| 8 days | D | E | E–F | F | F | D–E | E–F |
| 17 days | D | E | E–F | F | F | E | E–F |

*Gel characteristics listed in order of increasing viscosity (i.e. A < B, etc.) are indicated by the following designations:
A = No noticeable change in viscosity
B = Slight increase in viscosity
C = Flowing gel
D = Tonguing gel
E = Rigid gel
F = Ringing gel Observation of the test results revealed that, after formation of the ringing gel with the low-molecular-weight polymers, syneresis occurred with water being expelled from the gel. No such syneresis occurred with the ringing gel formed by the mixture of polymers. Syneresis causes a shrinkage of the gel with some separation of the gel from the formation surfaces and is desirably avoided.

It is also noted that a rigid gel was produced by the mixture at a total polymer concentration of 1.5% over a period of 8 days (Sample 7). After 17 days, both Sample 6 and Sample 7 produced a rigid gel or a ringing gel. The mixture has produced a rigid or a ringing gel in the formation using 1.5% polymer equal to that produced by the low-molecular-weight polymers at the higher concentrations used in Samples 3–5. The gels formed in Sample 6 are very comparable to those formed in Sample 2. The benefits of solution viscosity variation and the use of lower quantities of polymer (which results in a less expensive polymer solution) have been achieved with no loss in gel quality by comparison to a low-molecular-weight polymer gel.

EXAMPLE 2

Three samples of mixed polymer solution were prepared using the same polyacrylamide polymers and procedures as in Example 1. Sample 8 contained 1.5% low-molecular-weight polymer and 0.2% of a high-molecular-weight polymer. Sample 9 contained 1.2% low-molecular-weight polymer and 0.6% high-molecular-weight polymer. Sample 10 contained 1.5% low-molecular-weight polymer and 0.5% high-molecular-weight polymer. In all samples, a chromium acetate crosslinking agent was used in an amount to provide a polymer/crosslinker ratio of about 60:1 by weight. The results are presented in Table 2.

TABLE 2*

| GEL TIME | SAMPLE 8<br>1.5% LMW/<br>0.2% HMW | SAMPLE 9<br>1.2% LMW/<br>0.6% HMW | SAMPLE 10<br>1.5% LMW<br>0.5% HMW |
|---|---|---|---|
| 23 hrs | A | C–D | C |
| 4 days | D–E | D–E | D–E |
| 5 days | D–E | D–E | D–E |
| 6 days | D–E | D–E | E |
| 15 days | E–F | E–F | E–F |

*Gel characteristics listed in order of increasing viscosity (i.e. A < B, etc.) are indicated by the following designations:
A = No noticeable change in viscosity
B = Slight increase in viscosity
C = Flowing gel
D = Tonguing gel
E = Rigid gel
F = Ringing gel The polymer gels prepared in accordance with the invention, which use a mixture of low- and high-molecular-weight polymers, result in a high final gel strength while utilizing lower concentrations of low-molecular-weight polymer. As can be seen from Tables 1 and 2 above, with the addition of the high-molecular-weight polymer, even with low-molecular-weight concentrations of 1.5% or lower, the final gels were rigid or ringing gels and were comparable to those gel samples having higher concentrations of low-molecular-weight polymer and no high-molecular-weight polymer.

Because the use of the low-and high-molecular-weight polymer mixture results in high final-gel strength using less low-molecular-weight polymer, the gels can be produced at a lower cost while still maintaining a high gel strength. This allows a greater volume of gel to be formed during formation treatment operations for the same cost, which, in turn, allows greater formation penetration by the gel as more of the polymer gel can be injected into the formation, improving the overall formation treatment. The resulting gel also has a high final gel strength so that, once in place, it is not easily flowed through, removed or leached from the formation. The gel prepared in accordance with the present invention can be used in low-permeable formations to block or reduce the permeability of the formation matrix. The present invention has particular application to water and gas shut-off in oil and gas production wells, fluid loss control, lost circulation control and the like during drilling and workover operations, the control of fluid flow in naturally fractured or stimulated wells and provides the ability to selectively and economically position high viscosity gel mixtures of high and low molecular weight polymers in high permeability zones.

Addition of low-molecular-weight polymers to high-molecular-weight polymer systems can improve overall gel strength without huge increase in polymer concentration and cost. Capping large volume treatments with the low-molecular-weight/high-molecular-weight mixtures forms a stronger near wellbore block. Under radial flow, such blocks in the near wellbore region require very high resistance factors. Such use of the mixture provides the strong block.

Addition of high-molecular-weight polymers to low-molecular-weight systems can reduce leak-off into the formation when treating naturally occurring faults and fractures, hydraulic fractures, lost circulation zones, extreme high permeability thief zones and the like, and reduce penetration of the polymer solution into low permeability zones, which provides another option for fullbore treatments. Without the use of selective placement techniques, low permeability oil-bearing zones are subject to damage by the polymer. A filter cake formed by addition of high-molecular-weight polymers to a low-molecular-weight polymer system can "cover" the low permeability zones. This cake can then be removed by gel breakers, polymer breakers or perforations.

Having described specific embodiments of the present invention, it will be understood that modifications thereof may be suggested to those skilled in the art, and it is intended to cover all such modifications as fall within the scope of the appended claims.

Having thus described the invention, we claim:

1. A method of treating a permeable formation penetrated by at least one wellbore comprising:

preparing an aqueous solution of hydrophilic polymers containing polymers consisting essentially of from about 0.05 to about 2.0 weight percent high-molecular-weight polymers having an average molecular weight of at least 2,000,000, and from about 0.1 to about 10.0 weight percent low-molecular-weight polymers having an average molecular weight up to about 1,000,000; and injecting the aqueous solution along with a crosslinking agent into the formation via the wellbore and allowing the aqueous solution of hydrophilic polymers to crosslink to form a gel.

2. The method of claim 1, wherein:

the average molecular weight of the high-molecular-weight polymers is at least about two times greater than that of the low-molecular-weight polymers.

3. The method of claim 1, wherein:

the high-molecular-weight hydrophilic polymers are present in the aqueous solution in an amount from about 0.1 to about 1.0 weight percent of the aqueous solution, and the low-molecular-weight polymers are present in the aqueous solution in an amount from about 0.5 to about 3.5 weight percent of the aqueous solution.

4. The method of claim 1, wherein:

the high-molecular-weight hydrophilic polymers are present in the aqueous solution in an amount from about 0.3 to about 0.9 weight percent of the aqueous solution, and the low-molecular-weight polymers are present in the aqueous solution in an amount from about 1.0 to about 2.5 weight percent of the aqueous solution.

5. The method of claim 1, wherein:

the high-molecular-weight polymers have a molecular weight ranging from about 2,000,000 to about 30,000,000, and the low-molecular-weight polymers have a molecular weight ranging from about 60,000 to about 1,000,000.

6. The method of claim 1, wherein:

the high-molecular-weight polymers have a molecular weight ranging from about 3,000,000 to about 20,000,000 and the low-molecular-weight polymers have a molecular weight ranging from about 100,000 to about 500,000.

7. The method of claim 1, wherein:

the hydrophilic polymers are selected from a group consisting of polyacrylamides, partially hydrolyzed polyacrylamides, polymethacrylamides and partially hydrolyzed polymethacrylamides, sulfonated acrylamide polymers, polyvinyl polymers, polyalkylenoxides and the ammonia and alkali metal salts thereof, polysaccharides, cellulose ethers, carboxyalkylcellulose polymers and glactomannans.

8. The method of claim 7, wherein:

the inorganic crosslinking agent is selected from a group consisting of the salts and metal complexes of chromium, zirconium, titanium and aluminum.

9. The method of claim 8, wherein:

a delaying agent is combined with the crosslinking agent.

10. An aqueous polymer composition comprising water and hydrophilic polymers for use in treating a permeable formation to reduce the formation's permeability, the composition consisting essentially of:

a) water;

b) from about 0.05 to about 2.0 weight percent of the composition high-molecular-weight polymers having an average molecular weight of at least about 2,000,000 and from about 0.1 to about 10.0 weight percent of the composition low-molecular-weight polymers having an average molecular weight up to about 1,000,000; and c) a crosslinking agent for crosslinking the hydrophilic polymers to form a gel.

11. The composition of claim 10, wherein:

the average molecular weight of the high-molecular-weight polymers is at least about two times that of the low-molecular-weight polymers.

12. The composition of claim 10, wherein:

the high-molecular-weight hydrophilic polymers are present in the composition in an amount from about 0.1 to about 1.0 weight percent of the composition, and the low-molecular-weight polymers are present in the composition in an amount from about 0.5 to about 3.5 weight percent of the composition.

13. The composition of claim 10, wherein:

the high-molecular-weight hydrophilic polymers are present in the composition in an amount from about 0.3 to about 0.9 weight percent of the composition, and the low-molecular-weight polymers are present in the composition in an amount from about 1 to about 2.5 weight percent of the composition.

14. The composition of claim 10 wherein:

the high-molecular-weight polymers have a molecular weight ranging from about 2,000,000 to about 30,000,000, and the low molecular-weight polymer have a molecular weight ranging from about 60,000 to about 1,000,000.

15. The composition of claim 10 wherein:

the high-molecular weight polymers have a molecular weight ranging from about 2,000,000 to about 20,000,000, and the low molecular-weight polymer have a molecular weight ranging from about 100,000 to about 500,000.

16. The composition of claim 10 wherein:

the high-molecular-weight polymers have a molecular weight ranging from about 5,000,000 to about 15,000,000, and the low molecular-weight polymer have a molecular weight ranging from about 150,000 to about 300,000.

17. The composition of claim 10 wherein:

the hydrophilic polymers are selected from a group consisting of polyacrylamides, partially hydrolyzed polyacrylamides, polymethacrylamides and partially hydrolyzed polymethacrylamides, sulfonated acrylamide polymers, polyvinyl polymers, polyalkylenoxides and the ammonia and alkali metal salts thereof, polysaccharides, cellulose ethers, carboxyalkylcellulose polymers and glactomannans.

18. The composition of claim 10 wherein:

the crosslinking agent is an inorganic crosslinking agent selected from a group consisting of the salts and metal complexes of chromium, zirconium, titanium and aluminum.

19. The composition of claim 10 wherein:

the crosslinking agent is an organic crosslinking agent selected from a group consisting of phenol, aldehyde and ether compounds.

20. The method of claim 1 wherein the hydrophilic polymers are selected from the group consisting of polyacrylamides, partially hydrolyzed polyacrylamides, polymethacrylamides, partially hydrolyzed polymethacrylamides and sulfonated acrylamide polymers.

21. The composition of claim 10 wherein the hydrophilic polymers are selected from the group consisting of polyacrylamides, partially hydrolyzed polyacrylamides, polymethacrylamides, partially hydrolyzed polymethacrylamides and sulfonated acrylamide polymers.

* * * * *